United States Patent
Wu et al.

(10) Patent No.: US 8,718,602 B2
(45) Date of Patent: *May 6, 2014

(54) METHOD AND SYSTEM FOR REMOTE CONTROL OF SMART CARD

(75) Inventors: Chuanxi Wu, Shenzhen (CN); Jingwang Ma, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 94 days.

This patent is subject to a terminal disclaimer.

(21) Appl. No.: 13/258,131

(22) PCT Filed: Dec. 23, 2009

(86) PCT No.: PCT/CN2009/075888
§ 371 (c)(1), (2), (4) Date: Feb. 28, 2012

(87) PCT Pub. No.: WO2011/022913
PCT Pub. Date: Mar. 3, 2011

(65) Prior Publication Data
US 2012/0149331 A1 Jun. 14, 2012

(30) Foreign Application Priority Data
Aug. 28, 2009 (CN) .......................... 2009 1 0171736

(51) Int. Cl.
*H04M 11/00* (2006.01)

(52) U.S. Cl.
USPC ........ 455/408; 455/414.1; 455/418; 455/466; 379/161; 379/168; 379/48; 709/203; 709/210; 709/223; 713/193; 713/194; 726/17; 726/27; 726/35; 726/36; 340/426.1; 340/438; 340/5.8

(58) Field of Classification Search
USPC ............. 455/404.2, 410, 414.1, 432.1, 456.1, 455/418, 422.1, 432.3, 435.1, 466; 370/328–338, 270; 379/161, 168, 184, 379/194, 48, 201.02; 713/193, 194; 709/203, 210, 223; 726/4, 17, 27, 23, 726/35, 36; 340/426.1, 438, 507, 541, 5.8, 340/6.1
See application file for complete search history.

(56) References Cited

U.S. PATENT DOCUMENTS 5,600,708 A * 2/1997 Meche et al. ................. 455/411
5,898,783 A * 4/1999 Rohrbach .................... 340/5.31
(Continued)

FOREIGN PATENT DOCUMENTS

CN 1512799 A 7/2004
CN 1533207 A 9/2004
(Continued)

OTHER PUBLICATIONS

International Search Report on international application No. PCT/CN2009/075888, mailed on Mar. 6, 2010.
(Continued)

*Primary Examiner* — Quan M Hua
(74) *Attorney, Agent, or Firm* — Oppedahl Patent Law Firm LLC

(57) ABSTRACT

The disclosure discloses a method and a system for remote control of a smart card; the method comprises: receiving, by a smart card management platform, a request for performing a LOCKING/UNLOCKING operation for a smart card from a user (S101); and the smart card management platform performs a short message interaction with a terminal side through a mobile network platform based on the request, so as to make the terminal side perform the LOCKING/UNLOCKING operation for the smart card (S103). By means of the disclosure, the effects are achieved that the user can apply to a smart card supervision department for locking/unlocking the smart card and a terminal through a short message and disabling or enabling the smart card, when the smart card and the terminal in which the smart card is located are robbed, lost, stolen and has a serious illegal behavior, so as to protect the security of the user and the smart card relevant department to the greatest extent and provide a better flexibility for a payment system.

14 Claims, 12 Drawing Sheets

(56) References Cited

U.S. PATENT DOCUMENTS

| | | | |
|---|---|---|---|
| 6,542,730 B1* | 4/2003 | Hosain | 455/410 |
| 6,662,023 B1* | 12/2003 | Helle | 455/558 |
| 7,336,974 B2 | 2/2008 | Choi | |
| 2002/0069259 A1* | 6/2002 | Kushwaha et al. | 709/217 |
| 2004/0192388 A1 | 9/2004 | Dupuis et al. | |
| 2005/0153742 A1 | 7/2005 | Choi | |
| 2006/0154663 A1* | 7/2006 | Son et al. | 455/435.1 |
| 2008/0070590 A1* | 3/2008 | Miyajima et al. | 455/456.3 |
| 2009/0075630 A1* | 3/2009 | Mclean | 455/411 |
| 2010/0015942 A1* | 1/2010 | Huang et al. | 455/404.1 |
| 2010/0210240 A1* | 8/2010 | Mahaffey et al. | 455/411 |
| 2012/0149331 A1 | 6/2012 | Wu et al. | |
| 2012/0149332 A1* | 6/2012 | Wu et al. | 455/411 |
| 2012/0149333 A1* | 6/2012 | Wu et al. | 455/411 |
| 2012/0149357 A1* | 6/2012 | Wu et al. | 455/419 |

FOREIGN PATENT DOCUMENTS

| | | |
|---|---|---|
| CN | 1568069 A | 1/2005 |
| CN | 1780485 A | 5/2006 |
| CN | 1810052 A | 7/2006 |
| CN | 1819705 A | 8/2006 |
| CN | 1930901 A | 3/2007 |
| CN | 1941958 A | 4/2007 |
| CN | 1980459 A | 6/2007 |
| CN | 101018375 A | 8/2007 |
| CN | 101309518 A | 11/2008 |
| CN | 101499190 A | 8/2009 |
| EP | 1170969 A1 | 1/2002 |
| EP | 1220556 A1 | 7/2002 |
| EP | 2129146 A1 | 12/2009 |
| JP | 0589004 A | 4/1993 |
| JP | 2001268216 A | 9/2001 |
| JP | 2002259869 A | 9/2002 |
| JP | 2003-70063 A | 3/2003 |
| JP | 2003070063 A | 3/2003 |
| JP | 2003-219043 A | 7/2003 |
| JP | 2003219043 A | 7/2003 |
| JP | 2004-297156 A | 10/2004 |
| JP | 2004297156 A | 10/2004 |
| JP | 2006524019 A | 10/2004 |
| JP | 2004-348475 A | 12/2004 |
| JP | 2004348475 A | 12/2004 |
| JP | 2007521739 A | 12/2004 |
| JP | 2005057366 A | 3/2005 |
| JP | 2005-167463 A | 6/2005 |
| JP | 2005167463 A | 6/2005 |
| JP | 2006060685 A | 3/2006 |
| JP | 2006261990 A | 9/2006 |
| JP | 2006-524019 A | 10/2006 |
| JP | 2006352461 A | 12/2006 |
| JP | 2007116716 A | 5/2007 |
| JP | 2007521739 A | 8/2007 |
| JP | 2008500754 A | 1/2008 |
| JP | 2008-109306 A | 5/2008 |
| JP | 2008109306 A | 5/2008 |
| WO | 03094562 A1 | 11/2003 |
| WO | 2004114698 A1 | 12/2004 |
| WO | WO 2008092336 * | 8/2008 |

OTHER PUBLICATIONS

English Translation of the Written Opinion of the International Search Authority in international application No. PCT/CN2009/075888, mailed on Mar. 6, 2010.

International Search Report in international application No. PCT/CN2009/075882, mailed on May 27, 2010.

English Translation of the Written Opinion of the International Search Authority in international application No. PCT/CN2009/075882, mailed on May 27, 2010.

International Search Report in international application No. PCT/CN2009/075893, mailed on Jun. 3, 2010.

English Translation of the Written Opinion of the International Search Authority in international application No. PCT/CN2009/075893, mailed on Jun. 3, 2010.

* cited by examiner

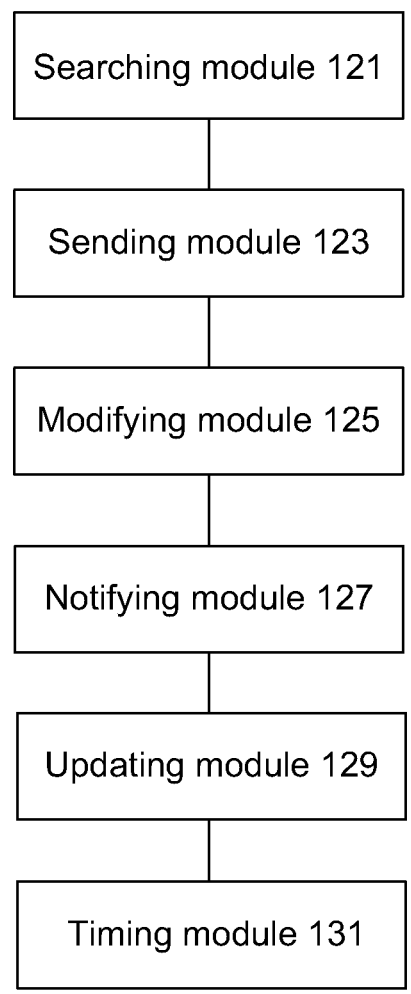

METHOD AND SYSTEM FOR REMOTE CONTROL OF SMART CARD

TECHNICAL FIELD

The disclosure relates to smart card technology, and specifically to a method and system for remote control of a smart card.

BACKGROUND

Electronic payment refers to capital circulation and payment within a computer network system in form of electronic data storage and transmission via the media of commercial electronic tools and various electronic currencies by means of computer and communication technology.

In the recent years, with the integration of technologies such as Internet, mobile communication, computer and the like, mobile electronic commerce, with mobile payment as a representative, has come into being. The mobile payment, as a new way of the electronic payment, has many advantages such as available at anytime and anywhere, convenient and fast, low in cost and the like. A consumer, as long as having a mobile phone, can implement financing or transaction and enjoy the convenience brought by the mobile payment. Nowadays, mobile phone payment is becoming a new highlight of the electronic commerce.

Additionally, a recent survey shows that, 82% of the participants fear that, if their mobile phones are lost or stolen, the information stored in their mobile phones (including smart cards) will be used to carry out a fraud. At the same time, 90% of the participants fear that their own personal data and financial data stored in lost mobile phones would be embezzled. Additionally, 72% of the persons admit that the information stored in their mobile phones is very important and difficult to be replaced. Because the users use the mobile phones to take part in various activities, such as the electronic payment and the like, it is really a disaster for the users if their mobile phones are lost. In this survey, 91% of the participants said that, losing the mobile phones for the electronic payment would cause severe losses for them. At the same time, as people increasingly depend on the mobile phone, operators must make their users feel safe. It is good to use the mobile phones more widely, but mobile operators must enhance the security of their user's personal data information and management level to rip the evil in the bud. Currently, some solutions have been raised for processes after the mobile phones for the electronic payment are lost or stolen. However, these solutions have some disadvantages, for example, the system may differ from the current payment process greatly, and thus great changes are required, or due to insufficient security of the system, a user's payment information may still be used illegally by others to make a false payment. Or, if the system does not handle the lost mobile phones timely, it will result in a user's huge loss, thus making the user feel unsafe. At present, there is no effective solution that has yet been proposed.

SUMMARY

In the prior art, as a system dedicated to processes after a mobile phone for electronic payment is lost or stolen is greatly different from that for a current payment flow, great changes are required; furthermore, delay and loss of a short message and similar situations are not taken into account, and balance between a system load and security of a user's smart card is not taken into account, either, which cause great inconvenience for the user. To this end, the main objective of the disclosure is to provide a method and a system for remote control of a smart card to solve the above problem.

In order to achieve the above objective, according to one aspect of the disclosure, a method for remote control of a smart card is provided.

The method for remote control of a smart card according to the disclosure comprises: receiving, by a smart card management platform, a request for performing a LOCKING/UNLOCKING operation for a smart card from a user; and performing, by the smart card management platform, a short message interaction with a terminal side through a mobile network platform, so as to make the terminal side perform the LOCKING/UNLOCKING operation for the smart card.

Preferably, the terminal side may further comprise a mobile station; performing, by the smart card management platform, the short message interaction with the terminal side comprises: receiving, by the mobile station in a normal operation state, a LOCKING/UNLOCKING short message sent by the mobile network platform; and executing, by the mobile station, a command in the LOCKING/UNLOCKING short message to perform the LOCKING/UNLOCKING operation on the smart card.

Preferably, the method may further comprise: after the mobile station performs the LOCKING/UNLOCKING operation on the smart card, placing the smart card in a locked state or unlocked state.

Preferably, the method may further comprise: after the smart card is in the locked/unlocked stated, returning, by the mobile station, a SUCCESSFUL PERFORMANCE short message to the mobile network platform.

Preferably, executing, by the mobile station, the command in the LOCKING/UNLOCKING short message to perform the LOCKING/UNLOCKING operation on the smart card may comprises: inactivating, by the mobile station, the smart card through locking hardware of the smart card, and activating the smart card through unlocking the hardware of the smart card; or, inactivating or activating, by the mobile station, the smart card through executing preinstalled software.

Preferably, performing, by the smart card management platform, the short message interaction with the terminal side may further comprises: if the smart card management platform fails to receive the SUCCESSFUL PERFORMANCE short message returned by the terminal side within a predetermined time, continuing, by the smart card management platform, to send the LOCKING/UNLOCKING short message to the terminal side through the mobile network platform.

Preferably, continuing, by the smart card management platform, to send the LOCKING/UNLOCKING short message to the terminal side through the mobile network platform may comprise: stopping, by the smart card management platform, sending the LOCKING/UNLOCKING short message, if the smart card management platform has sent the LOCKING/UNLOCKING short message to the terminal side through the mobile network platform for more than a preset number of times.

Preferably, continuing, by the smart card management platform to send the LOCKING/UNLOCKING short message to the terminal side through the mobile network platform may comprise: sending, by the smart card management platform, the LOCKING/UNLOCKING short message to the terminal side at a predetermined interval, if the smart card management platform has sent the LOCKING/UNLOCKING short message to the terminal side through the mobile network platform for a preset number of times.

Preferably, continuing, by the smart card management platform to send the LOCKING/UNLOCKING short message to the terminal side through the mobile network platform may comprise: updating, by the smart card management platform, the smart card to a wait-to-be-locked or unlocked state if the mobile station in which the smart card is located is offline.

Preferably, the method may further comprise: continuing, by the smart card management platform, to send the LOCKING/UNLOCKING short message to the mobile station in which the smart card is located, when the offline mobile station in which the smart card is located is turned on or enters a service area.

Preferably, continuing, by the smart card management platform, to send the LOCKING/UNLOCKING short message to the mobile station in which the smart card is located may comprise: sending, by the smart card management platform, the LOCKING/UNLOCKING short message to the terminal side at a predetermined interval, if the smart card management platform has sent the LOCKING/UNLOCKING short message to the terminal side for a preset number of times.

Preferably, the method may further comprise: updating the smart card to a wait-to-be-locked or unlocked state, when the mobile station in which the smart card is located is offline.

Preferably, the method may further comprise: after the smart card is updated to the wait-to-be-locked or unlocked state, when the offline mobile station in which the smart card is located returns to the normal operation condition and registers to the mobile network platform, sending, by the mobile network platform, a LOCKING/UNLOCKING command to the mobile station in which the smart card is located, and executing, by the mobile station, the LOCKING/UNLOCKING command.

Preferably, the offline state may comprise: a state in which the mobile station is turned off; or a state in which the mobile station is not in a service area.

Preferably, the method may further comprise: after the smart card management platform receives the user's request, judging by the smart card management platform, whether the smart card is valid.

Preferably, the method may further comprise: before the smart card management platform performs the short message interaction with the terminal side through the mobile network platform, performing a security certification between the mobile network platform and the terminal side.

Preferably, performing a security certification between the mobile network platform and the terminal side may comprise: the mobile station in which the smart card is located, after receiving the LOCKING/UNLOCKING short message, determining whether the message is a LOCKING/UNLOCKING short message from the smart card management platform, if so then performing a corresponding smart card locking/unlocking function according to a command in the LOCKING/UNLOCKING short message, and returning, by the mobile station in which the smart card is located, a SUCCESSFUL PERFORMANCE short message to the smart card management platform, otherwise processing the message as a routine short message.

Preferably, the method may further comprise: after the smart card management platform receives the request for performing the LOCKING/UNLOCKING operation on the smart card from the user, searching for, by the smart card management platform, state information of the mobile station in which the smart card is located through the mobile network platform.

Preferably, searching for, by the smart card management platform, state information of the mobile station in which the smart card is located through the mobile network platform may comprise: searching for, by the smart card management platform, the state information of the mobile station through the mobile network platform according to a mobile identification code and location area information of the mobile station.

Preferably, performing the LOCKING/UNLOCKING operation on the smart card may comprise: performing the LOCKING/UNLOCKING operation on the smart card or a payment application of the smart card.

Preferably, the method may further comprise: performing, by the smart card management platform, an interaction on the LOCKING/UNLOCKING command with the terminal side by the approach of an over-the-air technology, wherein the over-the-air technology comprises a bearer independent protocol.

In order to achieve the above target, according to another aspect of the disclosure, a method for remote control of a smart card is provided. The method comprises: notifying a smart card management platform by a smart card supervision platform if the smart card supervision platform finds that a user uses the smart card illegally or has corrected an illegal behaviour; and controlling, by the smart card management platform, a terminal side to accomplish locking/unlocking of the smart card through performing a short message interaction with the terminal side.

Preferably, the step that performing, by the smart card management platform, a interaction on the LOCKING/UNLOCKING short message with the terminal side may comprise: searching for, by the smart card management platform, the state information of the mobile station in which the smart card is located through a mobile network platform; when the mobile station is in a normal operation condition, sending, by the mobile network platform, a LOCKING/UNLOCKING short message command to the mobile station; and executing, by the mobile station, the LOCKING/UNLOCKING short message command to lock or unlock the smart card.

Preferably, searching for, by the smart card management platform, the state information of the mobile station in which the smart card is located through a mobile network platform may comprise: searching for, by the smart card management platform, the state information of the mobile station through the mobile network platform according to the mobile identification code and location area information of the mobile station.

Preferably, the method may further comprise: after the mobile station executes the command in the LOCKING/UNLOCKING short message to lock or unlock the smart card, sending, by the mobile station, a SUCCESSFUL PERFORMANCE short message to the mobile network platform; and modifying, by the mobile network platform, the state of the smart card to a locked or unlocked state.

Preferably, the method may further comprise: after the smart card management platform finds the state information of the mobile station in which the smart card is located through the mobile network platform, updating, by the mobile network platform, the state of the smart card to the wait-to-be-locked or unlocked state when the mobile station in which the smart card is located is offline.

In order to achieve the above objective, according to a further aspect of the disclosure, a system for remote control of a smart card is provided.

The system comprises: a mobile network platform, used for sending a command in a LOCKING/UNLOCKING short message; and a mobile station, used for executing the command in the LOCKING/UNLOCKING short message to lock or unlock the smart card.

Preferably, the system may further comprise: a smart card management platform, used for receiving a user's request and performing a short message interaction with the mobile station through the mobile network platform.

Preferably, the mobile network platform may further be used for searching for the station information of the mobile station in which the smart card is located.

A mobile terminal according to the disclosure comprises: a receiving module, used for receiving a short message request for locking/unlocking a smart card; and a performing module, used for performing the locking/unlocking of the smart card.

Preferably, the locking/unlocking of the smart card may comprise: the locking/unlocking of the smart card, or the locking/unlocking of a payment application of the smart card.

Preferably, the mobile terminal may further comprise: a sending module, used for sending a SUCCESSFUL PERFORMANCE short message.

A mobile network platform according to the disclosure comprises: a sending module, used for sending a LOCKING/UNLOCKING short message command to a mobile station when the mobile station is in a normal operation condition; and a modifying module, used for updating a state of a smart card, updating the smart card to a destroyed state if a mobile station and the smart card are online and a destroy process is performed successfully, and updating the smart card to a to-be-destroyed state if the mobile station and the smart card are offline.

Preferably, the locking/unlocking of the smart card may comprise: the locking/unlocking of the smart card, or the locking/unlocking of the payment application of the smart card.

Preferably, the mobile network platform may further comprise: a timing module, used for setting a time for sending a LOCKING/UNLOCKING command to the mobile station.

Preferably, the sending module may be used for sending a destroy instruction by the approach of an over-the-air technology, wherein the over-the-air technology comprises a bearer independent protocol.

By means of the disclosure, the problem that In the prior art, as a system dedicated to processes after a mobile phone for electronic payment is lost or stolen is greatly different from that for a current payment flow, great changes are required; furthermore, delay and loss of a short message and similar situations are not taken into account, and balance between a system load and security of a user's smart card is not taken into account, either, which cause great inconvenience for the user, can be solved by the following operations: a smart card management platform receives a request for performing the LOCKING/UNLOCKING operation for the smart card from a user, and the smart card management platform performs a short message interaction with a terminal side through a mobile network platform based on the request to make the terminal side perform the LOCKING/UNLOCKING operation on the smart card, thereby achieving the effects that the user can apply to a smart card supervision department for locking/unlocking the smart card and a terminal through a short message and disabling or enabling the smart card, when the smart card and the mobile state in which the smart card is located are robbed, lost, stolen and has a serious illegal behaviour, so as to protect the security of the user and the smart card relevant department to the greatest extent and provide a better flexibility for a payment system.

BRIEF DESCRIPTION OF THE DRAWINGS

FIG. 13 shows a schematic diagram of a mobile network platform according to the embodiment of the disclosure.

DETAILED DESCRIPTION

In the prior art, as a system dedicated to processes after a mobile phone for electronic payment is lost or stolen is greatly different from that for a current payment flow, great changes are required; furthermore, delay and loss of a short message and similar situations are not taken into account, and balance between a system load and security of a user's smart card is not taken into account, either, which cause great inconvenience for the user. In view of the above, the embodiments of the disclosure provide a method and a system for remote control of a smart card. The method comprises: receiving, by a smart card management platform, a request for performing a LOCKING/UNLOCKING operation on a smart card from a user; and performing, by the smart card management platform, a short message interaction with a terminal side through a mobile network platform based on the request, so as to make the terminal side perform the LOCKING/UNLOCKING operation on the smart card.

It should be noted that, if there is no conflict, embodiments of the present application and features of the embodiments can be combined with each other. The disclosure will be described in detail with reference to the accompanying drawings in conjunction with the embodiments.

According to the embodiment of the disclosure, a method for remote control of a smart card is provided.

Figure 1:
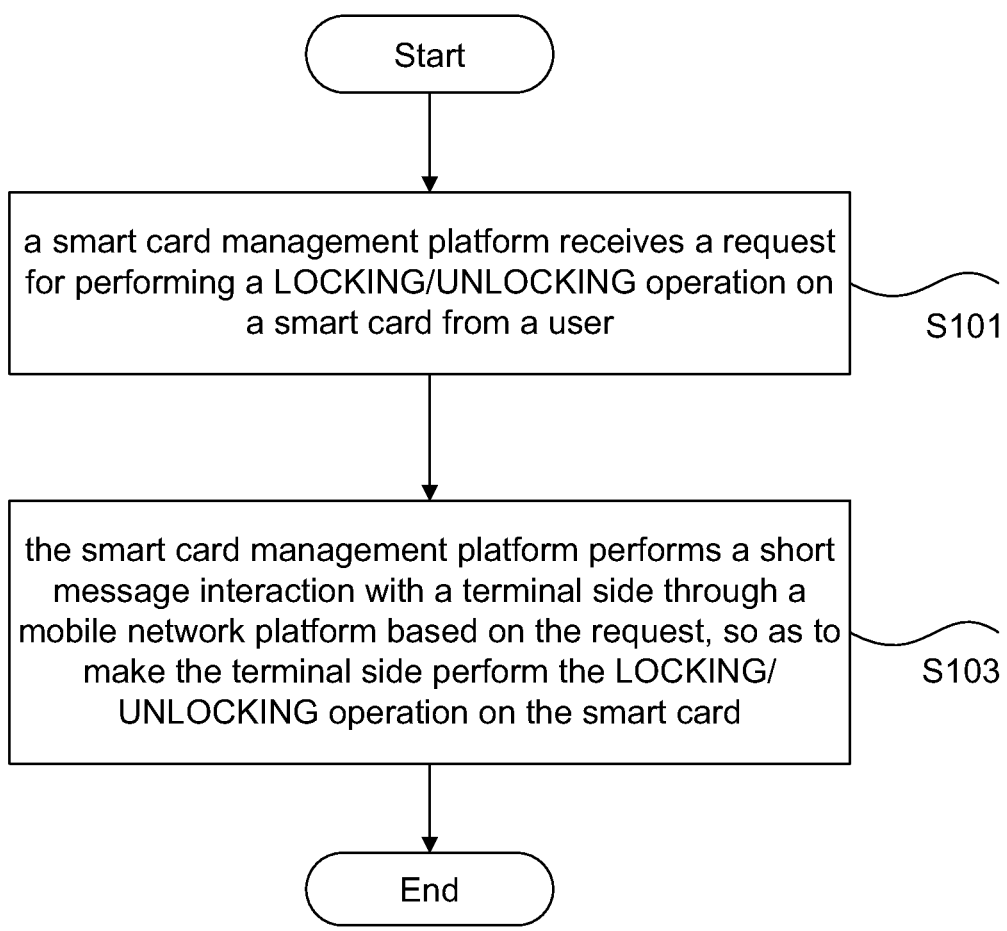
FIG. 1 shows a flowchart of a method for remote control of a smart card according to an embodiment of the disclosure.

FIG. 1 shows a flowchart of a method for remote control of a smart card according to an embodiment of the disclosure.

As shown in FIG. 1, the method comprises the following steps S101 to S103:

step S101: a smart card management platform receives a request for performing a LOCKING/UNLOCKING operation (or respectively referred to as disabling or enabling operation) on a smart card from a user; and step S103: the smart card management platform performs a short message interaction with a terminal side through a mobile network platform based on the request, so as to the terminal side perform the LOCKING/UNLOCKING operation on the smart card.

The implementation process of the embodiment of the disclosure will be described in conjunction with an example.

Figure 3:
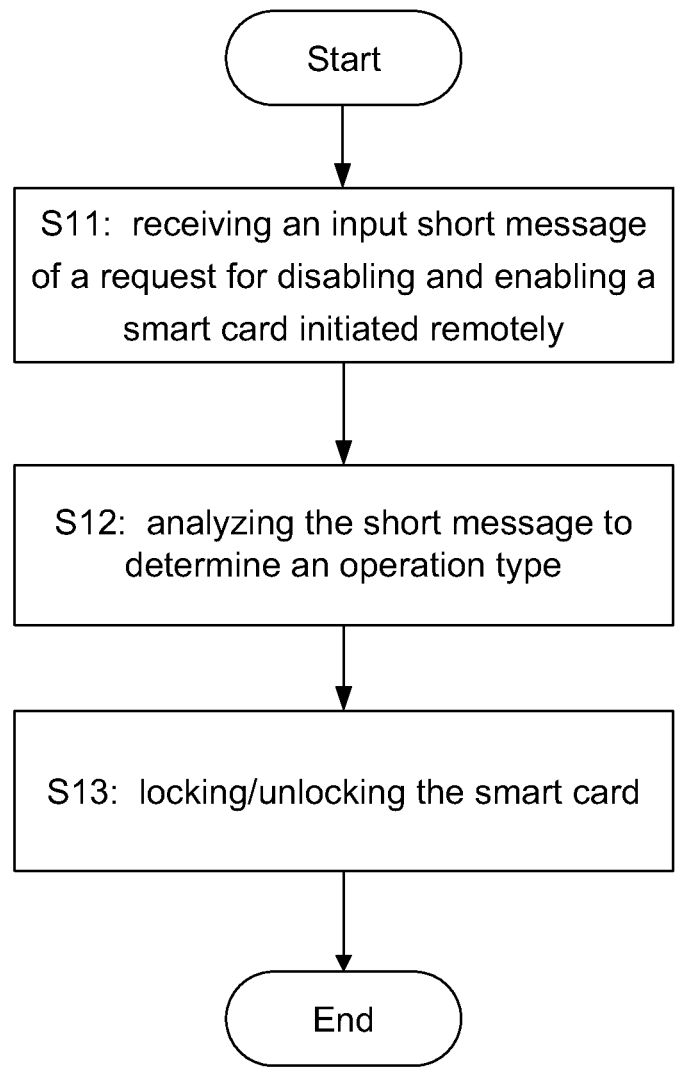
FIG. 3 shows a preferred flowchart of a method for remote control of a smart card according to the embodiment of the disclosure.
Figure 8:
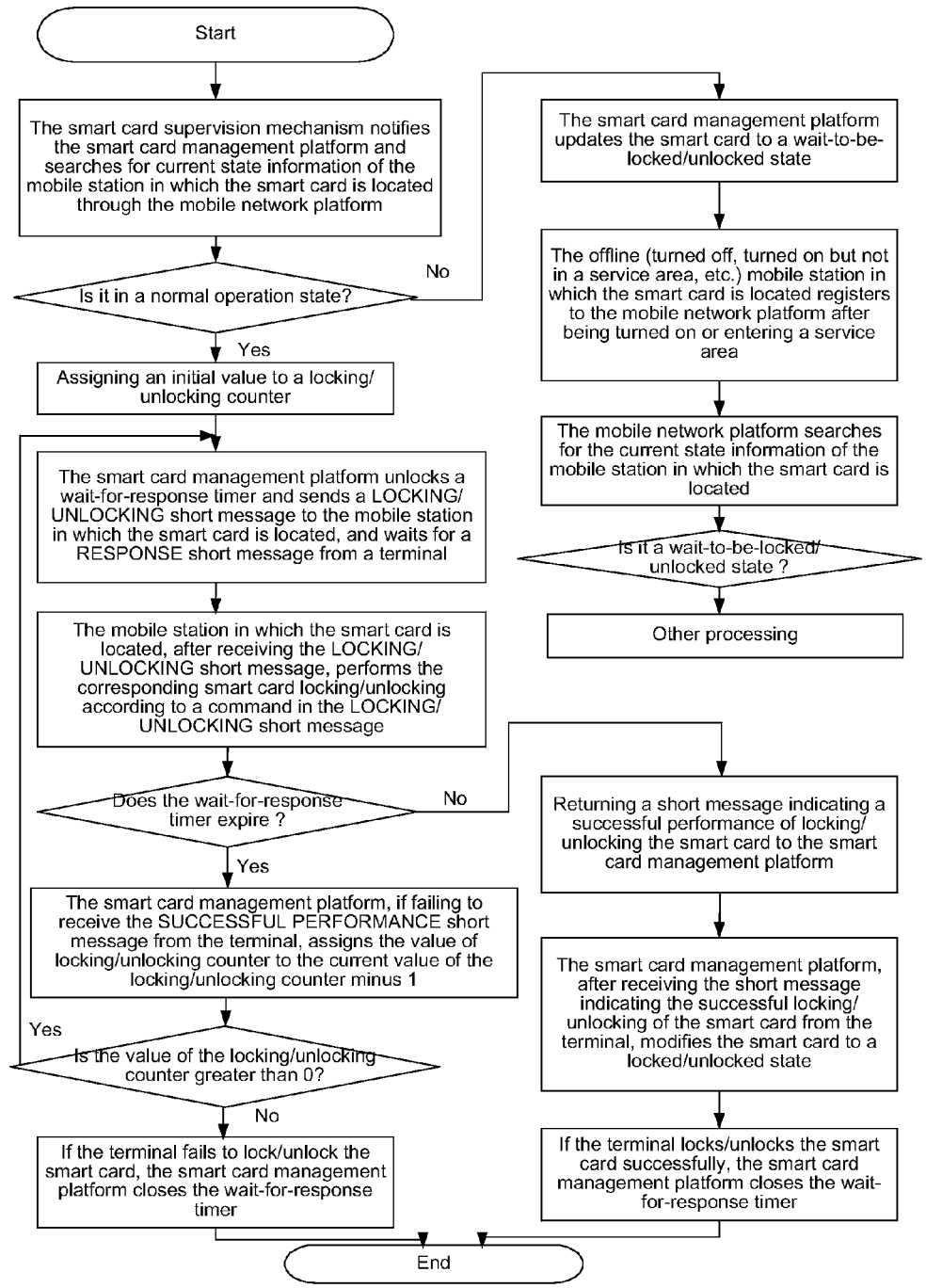
FIG. 8 shows a preferred flowchart of a method for remote control of a smart card according to the embodiment of the disclosure.
Figure 9:
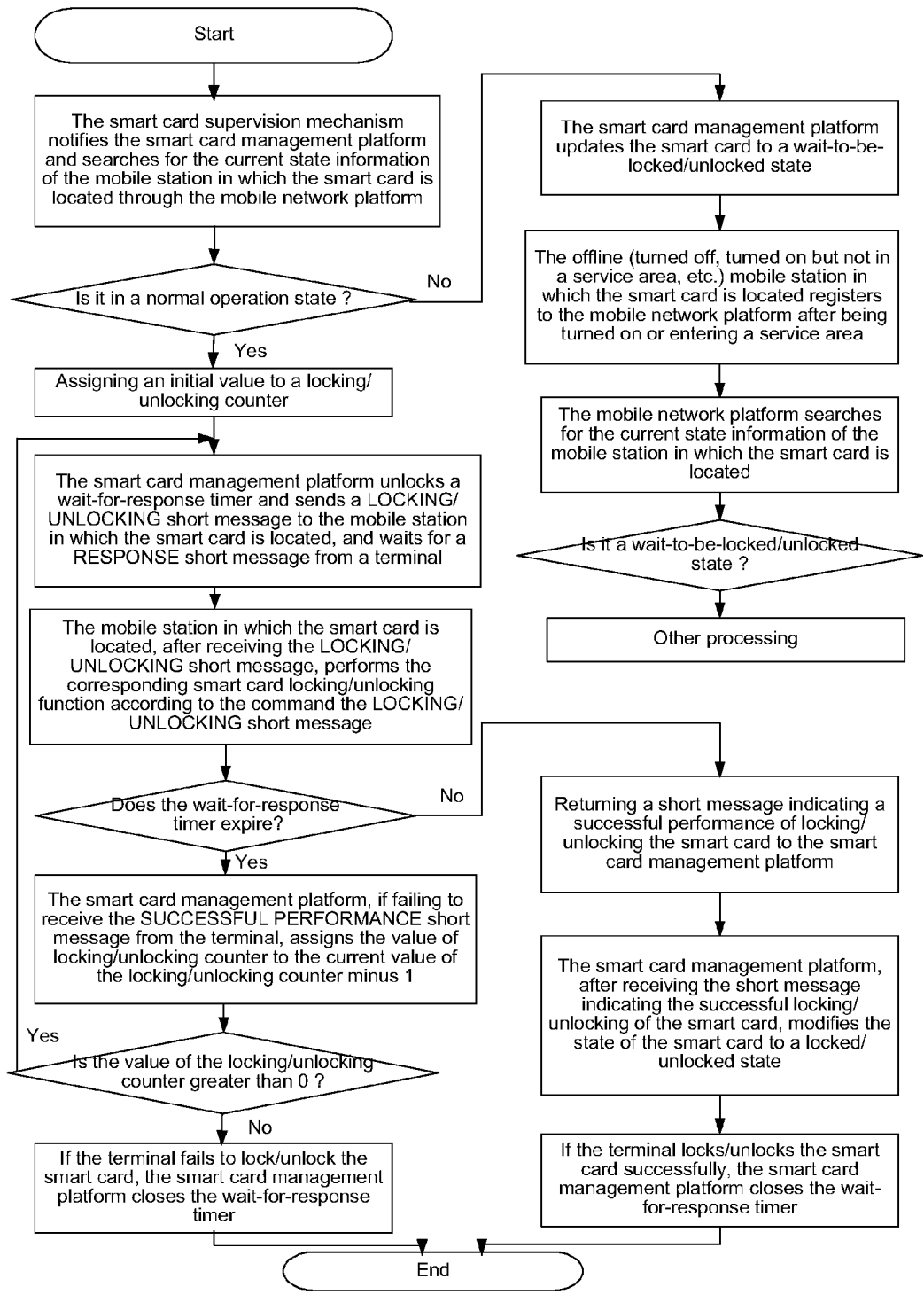
FIG. 9 shows a preferred flowchart of a method for remote control of a smart card according to the embodiment of the disclosure.
Figure 10:
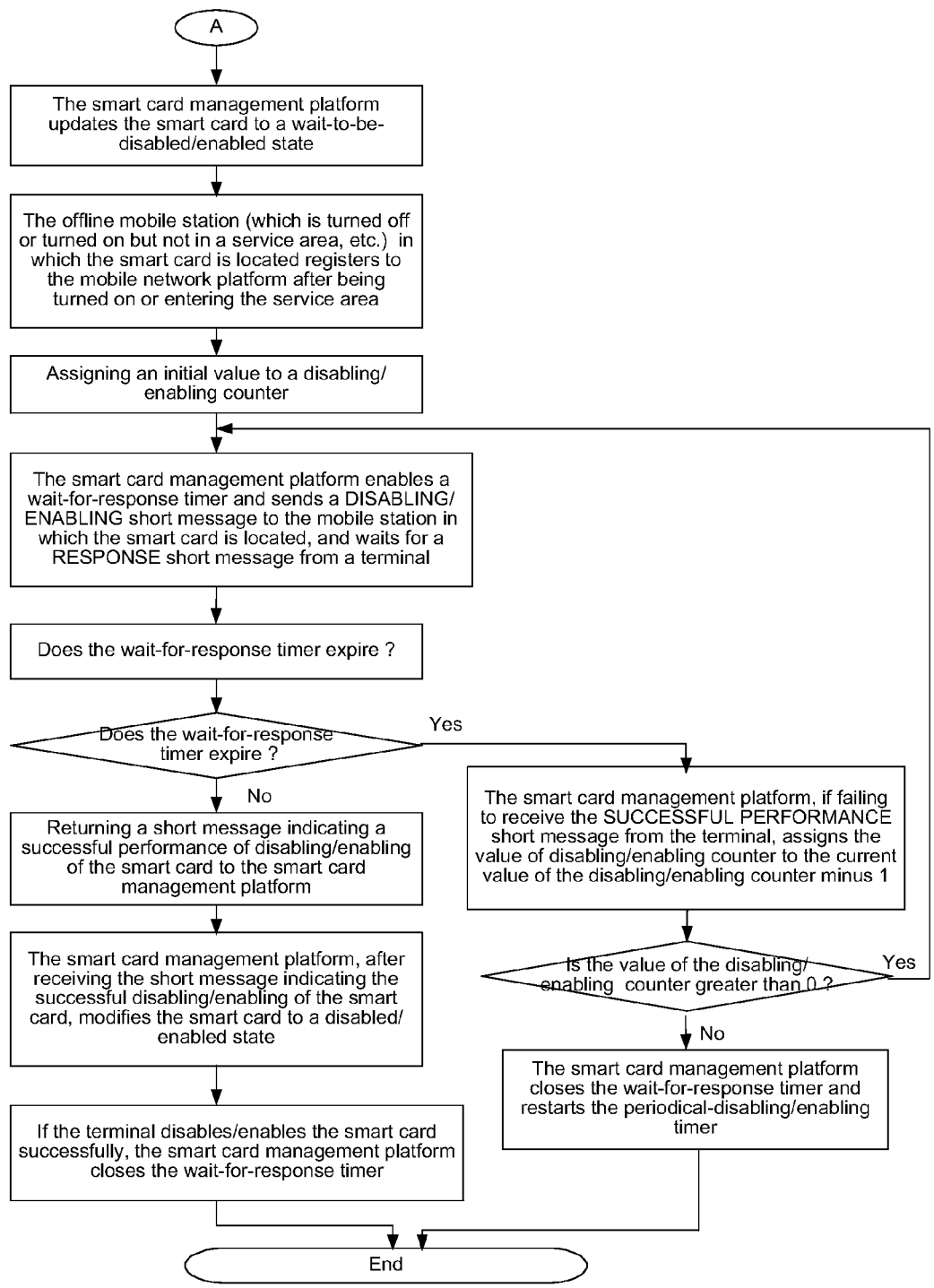
FIG. 10 shows a preferred flowchart of a method for remote control of a smart card according to the embodiment of the disclosure.

As shown in FIG. 3, in conjunction with FIG. 8, FIG. 9 and FIG. 10, the method for remote control of the smart card of the example comprises:

step S11: if a smart card supervision mechanism (e.g., a payment system platform or a smart card management platform etc.) finds that a user uses a smart card illegally or has corrected an illegal behaviour, the smart card supervision mechanism hands it over a smart card management platform to process;

step S12: the smart card management platform performs a short message interaction with the terminal side in which the smart card is located through a mobile network platform to perform the locking/unlocking of the smart card; and step S13: the terminal side accomplishes the locking/unlocking of the smart card.

Figure 2:
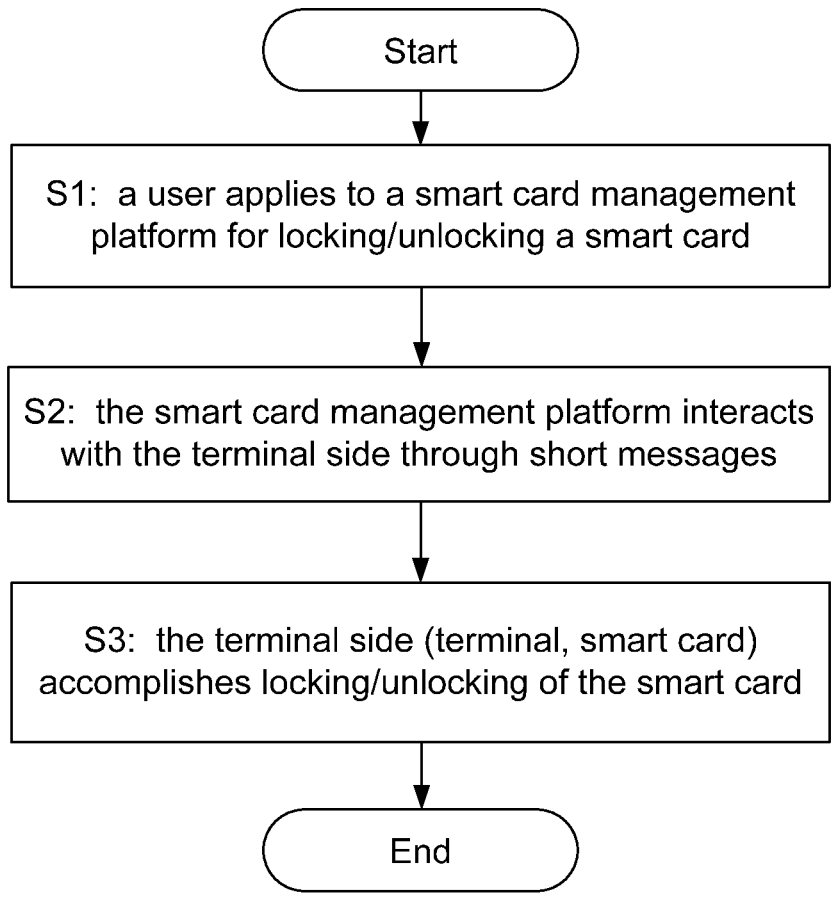
FIG. 2 shows a preferred flowchart of a method for remote control of a smart card according to the embodiment of the disclosure.
Figure 4:
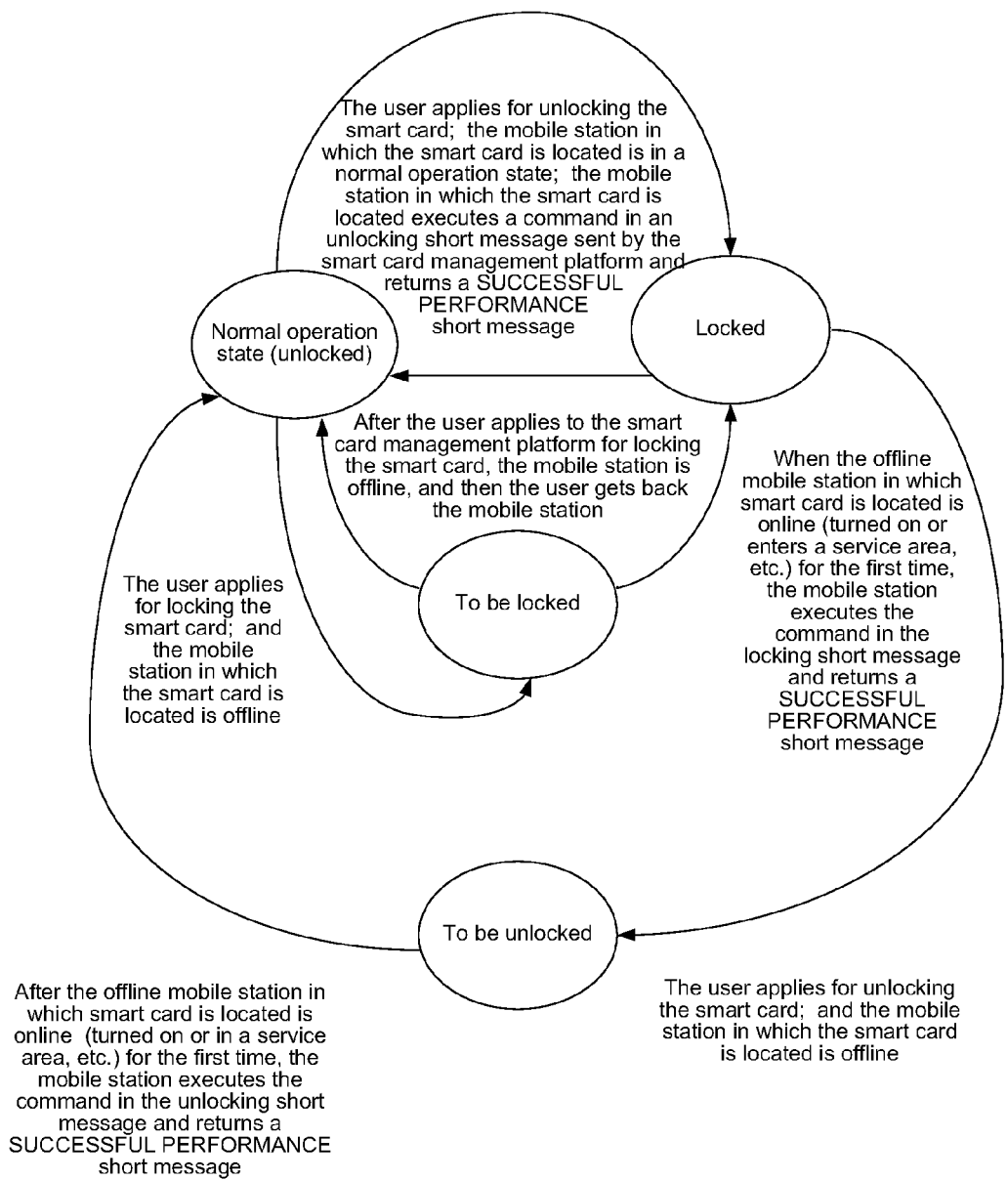
FIG. 4 shows a schematic diagram of a state machine at a network side according to the embodiment of the disclosure.
Figure 5:
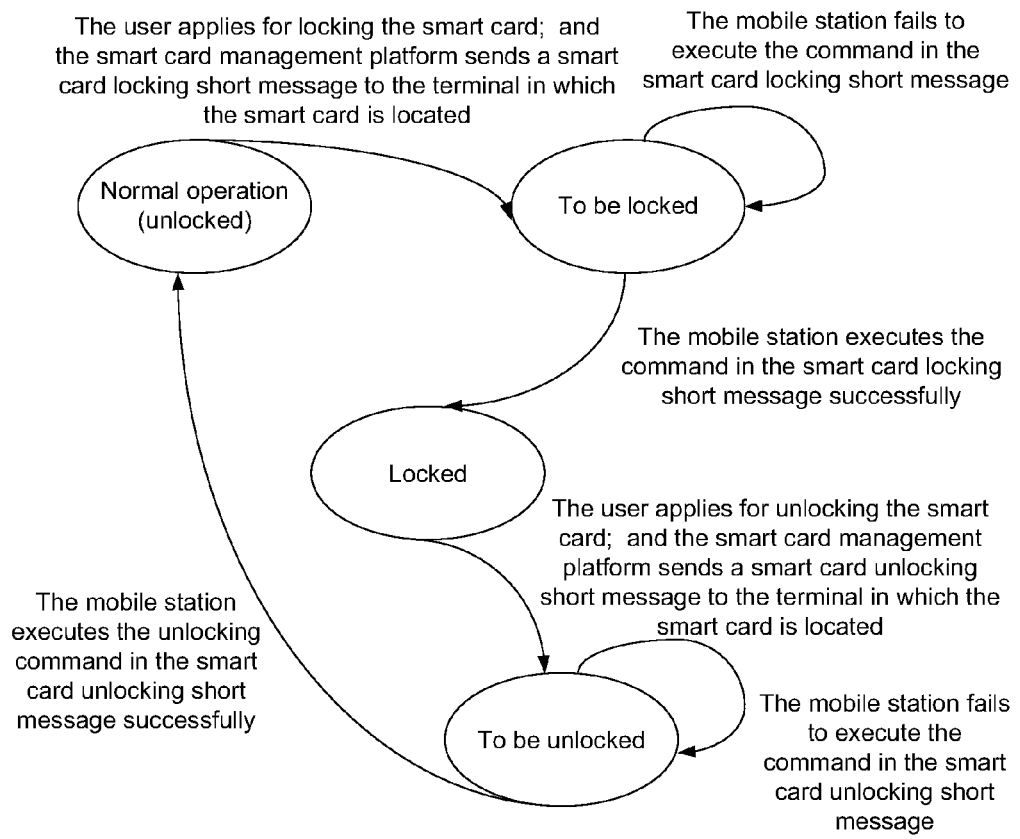
FIG. 5 shows a schematic diagram of a state machine at a terminal side according to the embodiment of the disclosure.

According to one aspect of the disclosure, a method for performing a remote LOCKING/UNLOCKING operation on an electronic payment smart card based on a short message is provided. FIG. 2 shows a preferred flowchart of a method for remote control of a smart card according to the embodiment of the disclosure; FIG. 4 shows a schematic diagram of a state machine at a network side according to the embodiment of the disclosure; and FIG. 5 shows a schematic diagram of a state machine at a terminal side according to the embodiment of the disclosure. As shown in FIG. 2, in conjunction with FIG. 4 and FIG. 5, the method for performing the LOCKING/UNLOCKING operation on the electronic payment smart card based on the short message comprises:

step S1: a user applies to a smart card management platform for disabling or enabling a smart card;

step S2: the smart card management platform performs a short message interaction with the terminal side in which the smart card is located through a mobile network platform to perform the locking/unlocking of the smart card; and step S3: the terminal side performs and accomplishes the locking/unlocking of the smart card.

Figure 7:
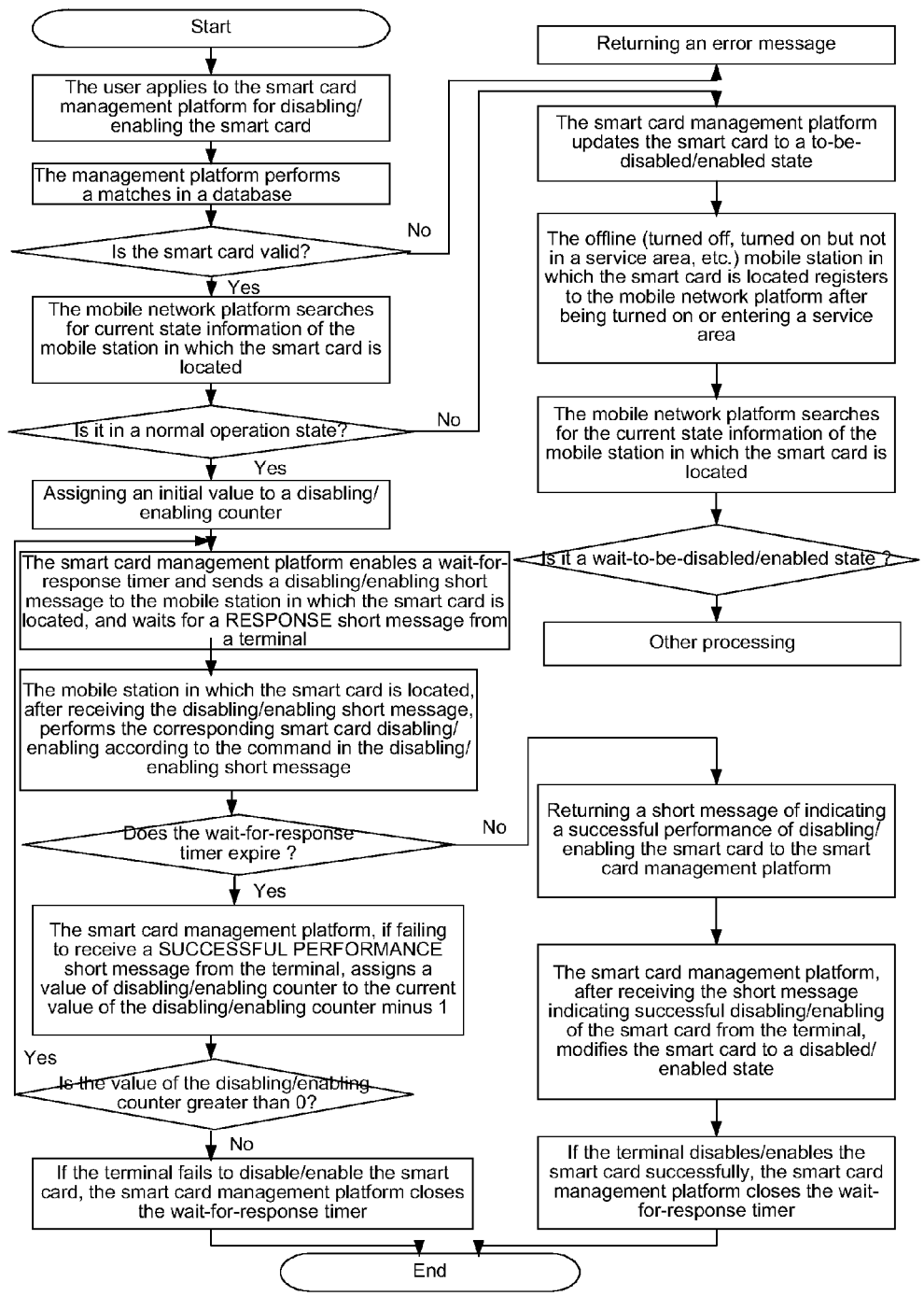
FIG. 7 shows a preferred flowchart of a method for remote control of a smart card according to the embodiment of the disclosure.

FIG. 7 shows a preferred flowchart of a method for remote control of a smart card according to the embodiment of the disclosure. As shown in FIG. 7, the above step S2 may comprise the following processes:

step S102: after receiving a request sent by a user to the smart card management platform for disabling or enabling the smart card (sending a request for locking/unlocking the smart card to the smart card management platform), the management platform performs a match with a database and, returns a failure message if the smart card is invalid, and the current process flow ends and, if the smart card is valid, turns to step S104;

step S104: the smart card management platform searches for current state information of the mobile station in which the smart card is located through the mobile network platform; if the mobile station in which the smart card is located is in a normal operation state, assigns an initial value to a locking/unlocking counter and the process flow is turned to step S106; otherwise, if the mobile station in which the smart card is located is offline, turns to step S112;

step S106: the smart card management platform enables a wait-for-response timer and sends a LOCKING/UNLOCKING short message to the mobile station in which the smart card is located, and waits for a RESPONSE short message from a terminal;

step S108: the mobile station in which the smart card is located, after receiving the LOCKING/UNLOCKING short message, performs a security certification on the origin of the short message to determine whether the short message is the LOCKING/UNLOCKING short message from the smart card management platform or not, if not, processes the message as a routine short message, and, if yes, performs a corresponding smart card locking/unlocking function according to a command in the LOCKING/UNLOCKING short message, and returns a SUCCESSFUL PERFORMANCE short message to the smart card management platform upon a successful performance of the smart card locking/unlocking function;

step S110: the smart card management platform modifies the state of the smart card to a locked/unlocked state after receiving the short message indicating the successful locking/unlocking of the smart card from the terminal; and turns to step S120;

step S112: if the mobile station in which the smart card is located is offline turned off, turned on but not in a service area, etc.), the smart card management platform modifies the state of the smart card to a wait-to-be-locked/unlocked state;

step S114: if in step S104, the smart card management platform has still not yet received the short message indicating the successful locking/unlocking returned by the terminal after the wait-for-response timer expires, it turns to step S116;

step S116: the smart card management platform assigns the value of locking/unlocking counter to the current value of the locking/unlocking counter minus 1, if the value of the locking/unlocking counter is greater than 0, it turns to step S106 and resends the LOCKING/UNLOCKING short message; otherwise, it turns to step S122;

step S118: when the offline (turned off, turned on but not in a service area, etc.) mobile station in which the smart card is located registers to the mobile network platform after being turned on or entering a service area, if the mobile network platform finds that the mobile station in which the smart card is located is in a wait-to-be-locked/unlocked state, the smart card management platform assigns an initial value to the locking/unlocking counter and turns to step S106;

step S120: if the terminal locks/unlocks the smart card successfully, the smart card management platform closes the wait-for-response timer, and the process of enabling/disabling the smart card ends; and step S122: if the terminal fails to lock/unlock the smart card, the smart card management platform closes the wait-for-response timer, and the process of enabling/disabling the smart card ends.

In the method, in step S108, the mobile station in which the smart card is located, after receiving the LOCKING/UNLOCKING short message and before executing a corresponding smart card locking/unlocking function, performs a security certification on the origin of the short message to determine whether the short message is a LOCKING/UNLOCKING short message from the smart card management platform.

Furthermore, in the method, the smart card management platform further comprises a periodical-locking/unlocking timer; after step S122, the method further comprises starting a process of periodical-locking/unlocking smart card. Wherein the process of periodical-locking/unlocking comprises:

step S202: the time length of the periodical-locking/unlocking timer is set as M and the timer is started; when the periodical-locking/unlocking timer expires, step S204 is performed;

step S204: the smart card management platform searches for the current state information of the mobile station in which the smart card is located; if the mobile station in which the smart card is located is in a normal operation state, it turns to step S206; otherwise, if the mobile station in which the smart card is located is offline, it turns to step S212;

step S206: the smart card management platform enables a wait-for-response timer and sends a LOCKING/UNLOCKING short message to the mobile station in which the smart card is located, and waits for a RESPONSE short message from a terminal;

step S208: the mobile station in which the smart card is located, after receiving the LOCKING/UNLOCKING short message, performs a corresponding smart card locking/unlocking function according to the command in the LOCKING/UNLOCKING short message, and returns a SUCCESSFUL PERFORMANCE short message to the smart card management platform upon a successful performance of the smart card locking/unlocking function;

step S210: the smart card management platform modifies the state of the smart card to a locked/unlocked state after receiving the short message indicating the successful locking/unlocking of the smart card from the terminal; and turns to step S236;

step S212: if the mobile station in which the smart card is located is offline (turned off, turned on but not in a service area, etc.), the smart card management platform modifies the state of the smart card to a wait-to-be-locked/unlocked state;

step S214: if in step S206, the smart card management platform has still not yet received the short message indicating the successful locking/unlocking returned by the terminal after the wait-for-response timer expires, it turns to step S216;

step S216: the smart card management platform closes the wait-for-response timer and restarts the periodical-locking/unlocking timer; and turns to step S202;

step S218: when the offline (turned off, turned on but not in a service area, etc.) mobile station in which the smart card is located registers to the mobile network platform after being turned on or in a service area, if the mobile network platform finds that the mobile station in which the smart card is located is in a wait-to-be-locked/unlocked state, the smart card management platform assigns an initial value to the locking/unlocking counter; and turns to step S226;

step S226: the smart card management platform enables the wait-for-response timer and sends a LOCKING/UNLOCKING short message to the mobile station in which the smart card is located, and waits for a RESPONSE short message from a terminal;

step S228: the mobile station in which the smart card is located, after receiving the LOCKING/UNLOCKING short message, performs a corresponding smart card locking/unlocking function according to the command in the LOCKING/UNLOCKING short message, and returns a SUCCESSFUL PERFORMANCE short message to the smart card management platform upon a successful performance of the smart card locking/unlocking function;

step S230: the smart card management platform modifies the state of the smart card to a locked/unlocked state after receiving the short message indicating the successful locking/unlocking of the smart card from the terminal; and turns to step S236;

step S232: if in step S226, the smart card management platform has still not yet received the short message indicating the successful locking/unlocking returned by the terminal after the wait-for-response timer expires, turns to step S234;

step S234: the smart card management platform assigns the value of locking/unlocking counter to the current value of the locking/unlocking counter minus 1, if the value of the locking/unlocking counter is greater than 0, turns to step S226 and resends the LOCKING/UNLOCKING short message; otherwise, it turns to step S202; and step S236: if the terminal locks/unlocks the smart card successfully, the smart card management platform closes the wait-for-response timer and closes the periodical-locking/unlocking timer, and the process of periodically enabling/disabling the smart card ends.

In the method, in step S3 and step S108, executing the corresponding smart card LOCKING/UNLOCKING command to lock/unlock the smart card comprises:

step S301: the function of the smart card is inactivated through disabling physical (smart card) hardware (device), and the payment function of the smart card is inactivated through disabling physical hardware (device), or, the function of the smart card is activated through enabling physical hardware (device), and the payment function of the smart card is activated through enabling physical hardware (device); and step S302: the function of the smart card is inactivated through executing preinstalled software (device), and the payment function of the smart card is inactivated through executing preinstalled software (device), or, the function of the smart card is activated through executing preinstalled software (device), and the payment function of the smart card is activated through executing preinstalled software (device).

In the above S302, the preinstalled software (device) can be preinstalled either in the smart card or in the mobile station in which the smart card is located.

When the software is preinstalled in the terminal in which the smart card is located, the step that the mobile station executes the LOCKING/UNLOCKING command includes:

step S400: destroying payment data in the smart card; and step S402: executing the preinstalled software in the terminal, which is a smart card locking/unlocking program.

When the software is preinstalled in the smart card, the step that the mobile station executes the LOCKING/UNLOCKING command is as follows:

step S502: copying the preinstalled software in the smart card, which is a smart card locking/unlocking program, into the terminal;

step S504: destroying payment data in the smart card; and step S506: executing the preinstalled software in the terminal, which is the copied smart card locking/unlocking program.

Additionally, in step S104, the smart card management platform searches for the current state information of the mobile station in which the smart card is located through the mobile network platform, and the mobile network platform gets the state information of the mobile station according to a mobile identification code and location area information of the mobile station.

In step S118, when the offline (turned off, turned on but not in a service area, etc.) mobile station in which the smart card is located registers to the mobile network platform after being turned on or in a service area, if the mobile network platform finds that the mobile station in which the smart card is located is in a wait-to-be-locked/unlocked state, the smart card management platform assigns an initial value to the locking/unlocking counter.

Figure 6:
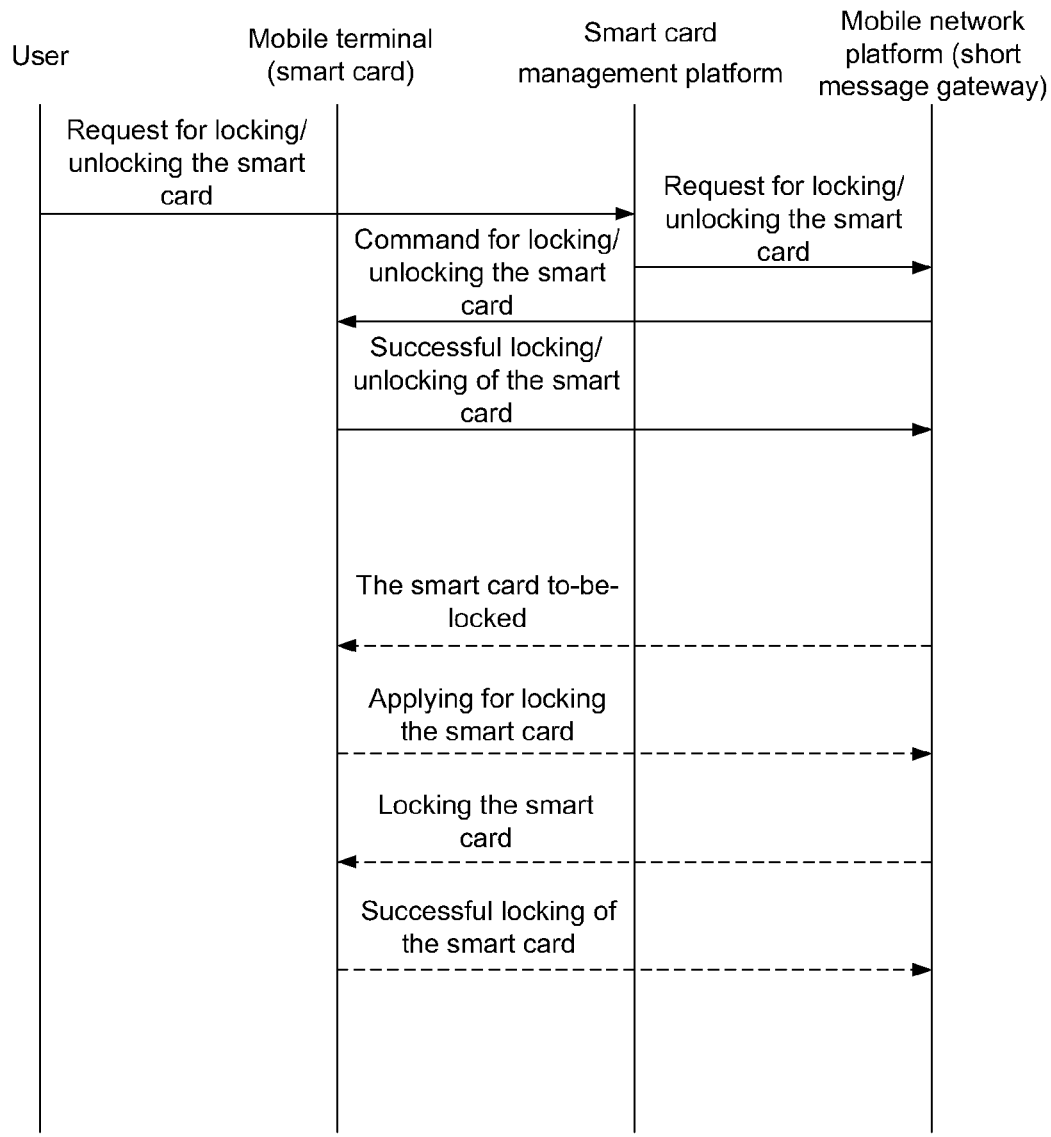
FIG. 6 shows a schematic diagram of implementing a system short message interaction according to the embodiment of the disclosure.

FIG. 6 shows a schematic diagram of implementing a system signalling interaction according to the embodiment of the disclosure. As shown in FIG. 6, a signalling interaction between the user and the mobile network platform is implemented by the shown signalling.

According to another aspect of the disclosure, a method for implementing remote disabling and enabling of an electronic payment smart card based on a short message is provided (here, this is a situation in which the management platform directly disables/enables the user's smart card without a user's application, and corresponds to the situation in which a user violates a relevant regulation). FIG. 3 shows a preferred flowchart of a method for remote control of a smart card according to the embodiment of the disclosure; FIG. 8 shows a preferred flowchart of a method for remote control of a smart card according to the embodiment of the disclosure; FIG. 9 shows a preferred flowchart of a method for remote control of a smart card according to the embodiment of the disclosure; and FIG. 10 shows a preferred flowchart of a method for remote control of a smart card according to the embodiment of the disclosure. As shown in FIG. 3, in conjunction with FIG. 8, FIG. 9 and FIG. 10, the method for remote control of a smart card of the example comprises:

step S11: if a smart card supervision mechanism (e.g., payment system platform or smart card management platform, etc.) finds that a user uses a smart card illegally or has corrected an illegal behaviour, the smart card supervision mechanism hands it over a smart card management platform to process;

step S12: the smart card management platform performs a short message interaction with the terminal side in which the smart card is located through a mobile network platform to perform the locking/unlocking of the smart card; and step S13: the terminal side accomplishes the locking/unlocking of the smart card.

step S11 and step S12 may comprise the following processes:

step S604: the smart card management platform searches for the current state information of the mobile station in which the smart card is located through the mobile network platform, if the mobile station in which the smart card is located is in a normal operation state, it assigns an initial value to a locking/unlocking counter and turns to step S606; otherwise, if the mobile station in which the smart card is located is offline, it turns to step S612;

step S606: the smart card management platform enables a wait-for-response timer and sends a LOCKING/UNLOCKING short message to the mobile station in which the smart card is located, and waits for a RESPONSE short message from a terminal;

step S608: the mobile station in which the smart card is located, after receiving the LOCKING/UNLOCKING short message, performs a security certification on the origin of the short message to determine whether the short message is a LOCKING/UNLOCKING short message from the smart card management platform or not, if not, it processes the message as a routine short message, and, if yes, it performs a corresponding smart card locking/unlocking function according to the command in the LOCKING/UNLOCKING short message, and returns a SUCCESSFUL PERFORMANCE short message to the smart card management platform upon a successful performance of the smart card locking/unlocking function;

step S610: the smart card management platform modifies the state of the smart card to a locked/unlocked state after receiving the short message indicating the successful locking/unlocking of the smart card from the terminal; and turns to step S620;

step S612: if the mobile station in which the smart card is located is offline (turned off, turned on but not in a service area, etc.), the smart card management platform updates the smart card to a wait-to-be-locked/unlocked state;

step S614: if in step S604, the smart card management platform has still not yet received the short message indicating the successful locking/unlocking returned by the terminal after the wait-for-response timer expires, it turns to step S616;

step S616: the smart card management platform assigns the value of locking/unlocking counter to the current value of the locking/unlocking counter minus 1, if the value of the locking/unlocking counter is greater than 0, it turns to step S606 and resends the LOCKING/UNLOCKING short message; otherwise, it turns to step S622;

step S618: when the offline (turned off, turned on but not in a service area, etc.) mobile station in which the smart card is located registers to the mobile network platform after being turned on or in a service area, if the mobile network platform finds that the mobile station in which the smart card is located is in a wait-to-be-locked/unlocked state, the smart card management platform assigns an initial value to the locking/unlocking counter, and turns to step S606;

step S620: if the terminal locks/unlocks the smart card successfully, it closes the wait-for-response timer, and the process of enabling/disabling the smart card ends.

step S622: if the terminal fails to lock/unlock the smart card, the wait-for-response timer is closed, and the process of enabling/disabling the smart card ends.

Furthermore, in the method, the smart card management platform further comprises a periodical-locking/unlocking timer; after step S622, the method further comprises starting a process of periodically locking/unlocking the smart card. Wherein the process of periodically locking/unlocking comprises:

step S702: the time length of the periodical-locking/unlocking timer is set as M and the timer is started, when the periodical-locking/unlocking timer expires, step S704 is performed;

step S704: the smart card management platform searches for the current state information of the mobile station in which the smart card is located; if the mobile station in which the smart card is located is in a normal operation state, it turns to step S706; otherwise, if the mobile station in which the smart card is located is offline, it turns to step S712;

step S706: the smart card management platform enables a wait-for-response timer and sends a LOCKING/UNLOCKING short message to the mobile station in which the smart card is located, and waits for a RESPONSE short message from a terminal;

step S708: the mobile station in which the smart card is located, after receiving the LOCKING/UNLOCKING short message, performs a corresponding smart card locking/unlocking function according to the command in the LOCKING/UNLOCKING short message, and returns a SUCCESSFUL PERFORMANCE short message to the smart card management platform upon a successful performance of the smart card locking/unlocking function;

step S710: the smart card management platform modifies the state of the smart card to a locked/unlocked state after receiving the short message indicating successful locking/unlocking of the smart card from the terminal; and turns to step S736;

step S712: if the mobile station in which the smart card is located is offline (turned off, turned on but not in a service area, etc.), the smart card management platform modifies the state of the smart card to a wait-to-be-locked/unlocked state;

step S714: if in step S706, the smart card management platform has still not yet received the short message indicating the successful locking/unlocking returned by the terminal after the wait-for-response timer expires, it turns to step S716;

step S716: the smart card management platform closes the wait-for-response timer and restarts the periodical-locking/unlocking timer; and turns to step S702;

step S718: when the offline (turned off, turned on but not in a service area, etc.) mobile station in which the smart card is located registers to the mobile network platform after being turned on or enters a service area, if the mobile network platform finds that the mobile station in which the smart card is located is in a wait-to-be-locked/unlocked state, the smart card management platform assigns an initial value to the locking/unlocking counter; and turns to step S726;

step S726: the smart card management platform enables the wait-for-response timer and sends a LOCKING/UNLOCKING short message to the mobile station in which the smart card is located, and waits for a RESPONSE short message from a terminal;

step S728: the mobile station in which the smart card is located, after receiving the LOCKING/UNLOCKING short message, performs a corresponding smart card locking/unlocking function according to the command in the LOCKING/UNLOCKING short message, and returns a SUCCESSFUL PERFORMANCE short message to the smart card management platform upon a successful performance of the smart card locking/unlocking function;

step S730: the smart card management platform modifies the state of the smart card to a locked/unlocked state after receiving the short message indicating the successful locking/unlocking of the smart card from the terminal; and turns to step S736;

step S732: if in step S726, the smart card management platform has still not yet received the short message indicating the successful locking/unlocking returned by the terminal after the wait-for-response timer expires, it turns to step S734;

step S734: the smart card management platform assigns the value of locking/unlocking counter to the current value of the locking/unlocking counter minus 1, if the value of the locking/unlocking counter is greater than 0, it turns to step S726 and resends the LOCKING/UNLOCKING short message; otherwise it turns to step S702; and step S736: if the terminal locks/unlocks the smart card successfully, the smart card management platform closes the wait-for-response timer and closes the periodical-locking/unlocking timer, and the process of timing enabling/disabling the smart card ends.

In the method, in step 2 and S602, the step that the mobile station in which the smart card is located executes the LOCKING/UNLOCKING command to lock/unlock the smart card comprises:

step S801: the function of the smart card is inactivated through disabling physical hardware (device), and the payment function of the smart card is inactivated through disabling physical hardware (device), or, the function of the smart card is activated through enabling physical hardware (device), and the payment function of the smart card is activated through enabling physical hardware (device); and step S802: the function of the smart card is inactivated through executing preinstalled software (device), and the payment function of the smart card is inactivated through executing preinstalled software (device), or, the function of the smart card is activated through executing preinstalled software (device), and the payment function of the smart card is activated through executing preinstalled software (device).

In S802, the preinstalled software (device) can be preinstalled either in the smart card or in the mobile station in which the smart card is located.

When the software is preinstalled in the terminal in which the smart card is located, the step that the mobile station executes the LOCKING/UNLOCKING command includes:

step S900: destroying payment data in the smart card; and step S902: executing the preinstalled software in the terminal, which is a smart card locking/unlocking program.

When the software is preinstalled in the smart card, the step that the mobile station executes the LOCKING/UNLOCKING command includes:

step S1002: copying the preinstalled software in the smart card, which is a smart card locking/unlocking program, into the terminal;

step S1004: destroying payment data in the smart card; and step S1006: executing the preinstalled software in the terminal, which is the copied smart card locking/unlocking program.

Additionally, in step S604, the smart card management platform searches for the current state information of the mobile station in which the smart card is located through the mobile network platform, and the mobile network platform gets the state information of the mobile station according to a mobile identification code and location area information of the mobile station.

In step S618, when the offline (turned off, turned on but not in a service area, etc.) mobile station in which the smart card is located registers to the mobile network platform after being turned on or entering a service area, if the mobile network platform finds that the mobile station in which the smart card is located is in a wait-to-be-locked/unlocked state, the smart card management platform assigns an initial value to the locking/unlocking counter.

According to a further aspect of the disclosure, a system for implementing remote disabling and enabling of an electronic payment smart card based on a short message is provided, wherein the system comprises:

a mobile terminal side, comprising a mobile terminal and an embedded smart card with payment function or an external smart card chip, wherein the mobile terminal side communicates with a smart card management platform through a mobile network platform (an equipment necessary for a mobile network, for example a mobile network access point such as a base station and a short message gateway, a network switch and the like), and receives and processes a short message for locking/unlocking the smart card sent from the smart card management platform to a mobile terminal; and a smart card management platform, receiving a request for disabling and enabling the smart card from a user, communicating with the mobile terminal side through the mobile network platform, and sending a short message for locking/unlocking the smart card to the mobile terminal side through the mobile network platform when receiving an application for locking/unlocking the smart card from the user.

As described above, the smart card comprises, but is not limited to a sim card, a R-UIM card, a usim card, a csim card, a UICC card, a Java card, an ATM card, a transportation card, a prepaid card and a card of any combination of the above cards.

The mobile terminal comprises, but is not limited to a standard terminal such as GSM, CDMA, WCDMA, Td-Scdma, cdma2000, data card, fixed station, LTE, LTE+, etc. and a multi-mode terminal of any combination thereof.

Furthermore, in the embodiment of the disclosure, the interaction between the smart card management platform and the terminal side can be implemented using the Over-the-Air (OTA) technology, wherein the OTA technology may comprise a Bearer Independent Protocol (BIP) and a short message channel.

The disclosure can avoid losses resulted from a payment user terminal being robbed, lost, stolen or the payment user having a serious illegal behaviour, considers the balance between a system load and the security of a user's smart card comprehensively, and overcomes the influence of the loss and delay of short messages during delivery on a business process, thereby accomplishing the disabling and enabling of the smart card and providing a better flexibility for the payment system.

According to the embodiment of the disclosure, a system for remote control of a smart card is provided.

The system may comprise: a request device, a communication device and a performing device.

Specifically, the request device is used for obtaining a request from a user; the communication device is used for performing an interaction between a mobile network platform and a mobile station and communication and data synchronization between the mobile network platform and a card management platform; and the performing device is used for the mobile station to perform locking and unlocking of a smart card.

Figure 11:
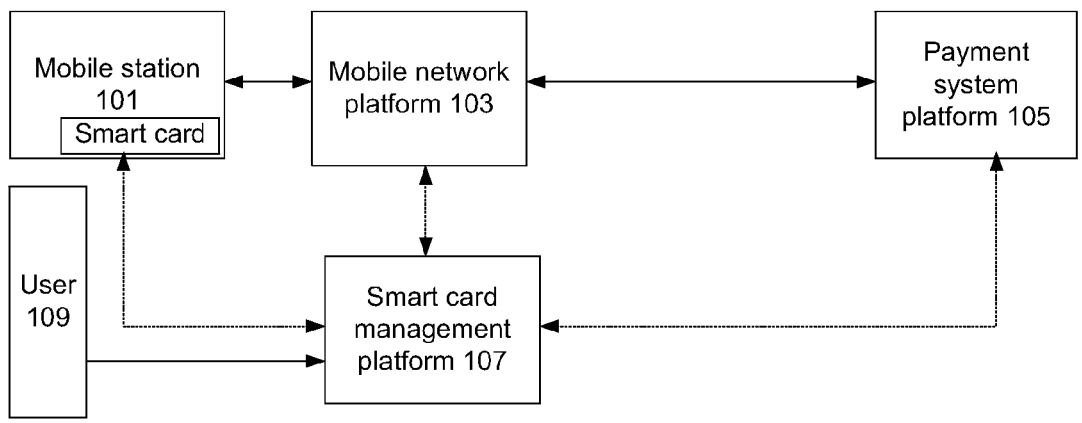
FIG. 11 shows a preferred schematic diagram of a system for remote control of a smart card according to the embodiment of the disclosure.

FIG. 11 shows a schematic diagram of a preferred system for remote control of a smart card according to the embodiment of the disclosure.

As shown in FIG. 11, the system comprises: a mobile network platform 103, a mobile station 101, a smart card management platform 107 and a payment system platform 105, wherein both the mobile network platform 103 and the smart card management platform 107 are connected to the payment system platform 105.

The mobile network platform 103 is used for sending a LOCKING/UNLOCKING short message command to the mobile station; and the mobile station 101 is used for executing the LOCKING/UNLOCKING command to lock or unlock the smart card.

Preferably, when a user 109 applies to the smart card management platform 107 for locking/unlocking the smart card, the smart card management platform 107 searches for the current state information of the mobile station in which the smart card is located through the mobile network platform; if the mobile station in which the smart card is located is in a normal operation state, the mobile network platform 103 directly sends a LOCKING/UNLOCKING command to the mobile station 101 in which the smart card is located; after the mobile station 101 in which the smart card is located executes the LOCKING/UNLOCKING command to lock or unlock the smart card, the mobile station 101 returns a SUCCESSFUL PERFORMANCE short message to the mobile network platform 103, and the mobile network platform 103 modifies the state of the smart card to a locked/unlocked state and notifies the smart card management platform 107 to update the smart card to the locked/unlocked state; and, if the mobile station 101 in which the smart card is located is offline (turned off, turned on but not in a service area, etc.), the mobile network platform 103 updates the smart card to a wait-to-be-locked/unlocked state and notifies the smart card management platform 107 to update a state database.

Figure 12:
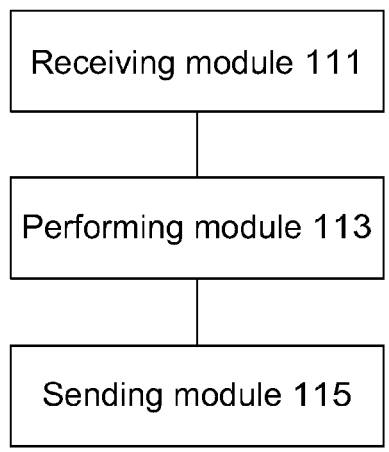
FIG. 12 shows a schematic diagram of a mobile station according to the embodiment of the disclosure.

FIG. 12 shows a schematic diagram of a mobile terminal (mobile station) according to the embodiment of the disclosure.

As shown in FIG. 12, the mobile terminal comprises: a receiving module 111, a performing module 113 and a sending module 115.

The receiving module 111 is used for receiving a short message request for locking/unlocking a smart card; the performing module 113 is used for performing the locking/unlocking of the smart card; and the sending module 115 is used for sending a Successful Modification message.

FIG. 13 shows a schematic diagram of a mobile network platform according to the embodiment of the disclosure.

As shown in FIG. 13, the mobile network platform comprises: a searching module 121, a sending module 123, a modifying module 125, a notifying module 127, an updating module 129 and a timing module 131.

Specifically, the searching module 121 is used for searching for the state information of the mobile station in which the smart card is located; the sending module 123 is used for sending a LOCKING/UNLOCKING command to the mobile station when the state information of the mobile station indicates that the mobile station is in a normal operation condition; the modifying module 125 is used for modifying the state of the smart card to a locked or unlocked state; the notifying module 127 is used for notifying the smart card management platform to update the smart card to the locked/unlocked state; the updating module 129 is used for updating the state of the smart card to a wait-to-be-locked/unlocked state when the state information indicates that the mobile station in which the smart card is located is offline; and the timing module 131 is used for setting the time for sending a LOCKING/UNLOCKING command to the mobile station.

It can be seen from the above description that, the disclosure can avoid losses resulted from a payment user terminal being robbed, lost, stolen or the payment user having a serious illegal behaviour, and provides a better flexibility for a payment system.

Those above are only the preferred embodiments of the disclosure and are not intended to limit the disclosure. For those skilled in the art, various changes and variations can be made to the disclosure. Any modifications, equivalent replacements, improvements and the like within the spirit and principle of the disclosure shall fall within the protection scope of the disclosure.

The invention claimed is:

1. A method for remote control of a smart card in a terminal side, comprising:
    after receiving, from a user, a request for performing a locking/unlocking operation on the smart card,
    performing, by a smart card management platform, a short message interaction with the terminal side through a mobile network platform of a mobile network, wherein the terminal side further comprises a mobile station, and wherein the smart card management platform stores dynamic data indicative of statuses of the smart card, the statuses of the smart card comprising a status of locking, a status of unlocking, a status of waiting for locking, and a status of waiting for unlocking;
    responsive to said request, querying, by the smart card management platform, a current operation state of the mobile station using the mobile station's identification and location information via the mobile network platform;
    controlling, by the smart card management platform via the mobile network platform, the mobile station to perform the locking/unlocking operation on the smart card based on a result of said query and in response changing the status of the smart card accordingly,
    wherein the controlling comprises:
        sending a locking short message, via the mobile network platform, by the smart card management platform, to the mobile station to perform a locking operation, in response to the query result; and changing the status of the smart card from unlocking to locking, sending a unlocking short message, via the mobile network platform, by the smart card management platform, to the mobile station to perform a unlocking operation, in response to the query result; and changing the status of the smart card from locking to unlocking;

updating, by the smart card management platform, the status of the smart card from unlocking to waiting for locking in response to detecting the mobile station is currently in an off line state, and in response to the mobile station being connected to the mobile network and the smart card having a waiting for locking status registered at the smart card management platform, sending, by the smart card management platform, the locking short message to the mobile station to perform a locking operation;

updating, by the smart card management platform, the status of the smart card from locking to waiting for unlocking in response to detecting the mobile station is currently in an off line state, and in response to the mobile station being connected to the mobile network and the smart card having a waiting for unlocking status registered at the smart card management platform, sending, by the smart card management platform, the unlocking short message to the mobile station to perform a unlocking operation;

wherein the off line state indicates the mobile station is turned off or not in a service area.

2. The method according to claim 1,
wherein performing, by the smart card management platform, the short message interaction with the terminal side comprises:
  receiving, by the mobile station that is currently connected to the mobile network, the locking/unlocking short message sent by the smart card management platform via the mobile network platform; and
  executing, by the mobile station, a command in the locking/unlocking short message to perform the locking/unlocking operation on the smart card, including inactivating, by the mobile station, the function of the smart card through locking hardware of the smart card, and activating the function of the smart card through unlocking the hardware of the smart card; or inactivating or activating, by the mobile station, the function of the smart card through executing preinstalled software; and
wherein the method further comprises:
  after the mobile station performs the locking/unlocking operation on the smart card,
  returning, by the mobile station, a SUCCESSFUL PERFORMANCE short message to the mobile network platform.

3. The method according to claim 2, wherein performing, by the smart card management platform, the short message interaction with the terminal side further comprises:
  if the smart card management platform fails to receive the SUCCESSFUL PERFORMANCE short message returned by the terminal side within a predetermined time, continuing, by the smart card management platform, to send the locking/unlocking short message to the terminal side through the mobile network platform.

4. The method according to claim 3, further comprising:
  stopping, by the smart card management platform, sending the locking/unlocking short message, if the smart card management platform has sent the locking/unlocking short message to the terminal side through the mobile network platform for more than a preset number of times.

5. The method according to claim 3, further comprising:
  sending, by the smart card management platform, the lockinq/unlockinq short message to the terminal side at a predetermined interval, if the smart card management platform has sent the locking/unlocking short message to the terminal side through the mobile network platform for a preset number of times.

6. The method according to claim 1, further comprising:
  after the smart card management platform receives the user's request, judging by the smart card management platform, whether the smart card is valid.

7. The method according to claim 1, further comprising:
  before the smart card management platform performs the short message interaction with the terminal side through the mobile network platform, performing a security certification between the mobile network platform and the terminal side;
  wherein performing a security certification between the mobile network platform and the terminal side comprises:
    the mobile station in which the smart card is located, after receiving the lockinq/unlockinq short message, determining whether the message is a locking/unlocking short message from the smart card management platform, if so, then performing a corresponding smart card locking/unlocking function according to a command in the lockinq/unlockinq short message, and returning, by the mobile station in which the smart card is located, a SUCCESSFUL PERFORMANCE short message to the smart card management platform, otherwise processing the message as a routine short message.

8. The method according to claim 1, wherein performing the locking/unlocking operation on the smart card comprises:
  performing the locking/unlocking operation on the smart card or a payment application of the smart card.

9. The method according to claim 1, further comprising:
  performing, by the smart card management platform, an interaction on the locking/unlocking command with the terminal side by the approach of an over-the-air technology, wherein the over-the-air technology comprises a bearer independent protocol.

10. A method for remote control of a smart card, comprising:
  after receiving, from a smart card supervision platform, a notification that a user uses the smart card illegally or has corrected an illegal behaviour;
  performing, by a smart card management platform, a short message interaction with the terminal side through a mobile network platform of a mobile network, wherein the terminal side further comprises a mobile station, and wherein
    the smart card management platform stores dynamic data indicative of statuses of the smart card, the statuses of the smart card comprising a status of locking, a status of unlocking, a status of waiting for locking, and a status of waiting for unlocking;
  responsive to said notification, querying, by the smart card management platform, a current operation state of the mobile station using the mobile station's identification and location information via the mobile network platform;
  controlling, by the smart card management platform via the mobile network platform, the mobile station to perform the locking/unlocking operation on the smart card based on a result of said query and in response changing the status of the smart card accordingly,
wherein the controlling comprises:
sending a locking short message, via the mobile network platform, by the smart card management platform, to the mobile station to perform a locking operation in response to the query result; and changing the status of the smart card from unlocking to locking,
sending a unlocking short message, via the mobile network platform, by the smart card management platform, to the mobile station to perform a unlocking operation in response to the query result; and changing the status of the smart card from locking to unlocking,
updating, by the smart card management platform, the status of the smart card from unlocking to waiting for locking in response to detecting the mobile station is currently in an off line state, and in response to the mobile station being connected to the mobile network and the smart card having a waiting for locking status registered at the smart card management platform, sending, by the smart card management platform, the locking short message to the mobile station to perform a locking operation,
updating, by the smart card management platform, the status of the smart card from locking to waiting for unlocking in response to detecting the mobile station is currently in an off line state, and in response to the mobile station being connected to the mobile network and the smart card having a waiting for unlocking status registered at the smart card management platform, sending, by the smart card management platform, the unlocking short message to the mobile station to perform a unlocking operation;
wherein the off line state indicates the mobile station is turned off or not in a service area.

11. The method according to claim 10,
wherein the performing, by a smart card management platform, a short message interaction with the terminal side comprises:
receiving, by the mobile station that is currently connected to the mobile network, the locking/unlocking short message sent by the smart card management platform via the mobile network platform; and
executing, by the mobile station, the locking/unlocking short message command to perform the locking/unlocking operation on the smart card;
wherein the method further comprises:
after the mobile station performs the locking/unlocking operation on the smart card, returning, by the mobile station, a SUCCESSFUL PERFORMANCE short message to the smart card management platform;
modifying, by the smart card management platform, the status of the smart card to locking or unlocking accordingly.

12. A system for remote control of a smart card, comprising:
a mobile station, comprising: an antenna, wherein the smart card is located in the mobile station;
a mobile network platform of a mobile network, further comprising:
a sending module including a circuitry, configured to send a locking/unlocking short message command to a mobile station when the mobile station is currently connected to the mobile network;
a timing module, used for setting a time for sending locking/unlocking command to the mobile station ; and
a smart card management platform, configured to,
receive a user's request for performing a locking/unlocking operation on the smart card, or receive a notification, from a smart card supervising platform, that a user uses the smart card illegally or has corrected an illegal behaviour,
perform a short message interaction with the mobile station via the mobile network platform of a mobile network,
responsive to said request or notification, query current operation state of the mobile station using the mobile station's identification and location information via the mobile network platform, and
control the mobile station via the mobile network platform to perform the locking/unlocking operation on the smart card based on a result of said query and in response change the status of the smart card accordingly,
wherein the smart card management platform stores dynamic data indicative of statuses of the smart card, the statuses of the smart card comprising a status of locking, a status of unlocking, a status of waiting for locking, and a status of waiting for unlocking, and wherein the controlling comprises:
sending a locking short message via the mobile network platform to the mobile station to perform a locking operation in response to the query result; and
changing the status of the smart card from unlocking to locking,
sending a unlocking short message via the mobile network platform to the mobile station to perform a unlocking operation in response to the query result; and
changing the status of the smart card from locking to unlocking, updating the status of the smart card from unlocking to waiting for locking in response to detecting the mobile station is currently in an off line state, and in response to the mobile station being connected to the mobile network and the smart card having a waiting for locking status registered at the smart card management platform, sending the locking short message to the mobile station to perform a locking operation,
updating the status of the smart card from locking to waiting for unlocking in response to detecting the mobile station is currently in an off line state, and in response to the mobile station being connected to the mobile network and the smart card having a waiting for unlocking status registered at the smart card management platform, sending the unlocking short message to the mobile station to perform a unlocking operation;
wherein the off line state indicates the mobile station is turned off or not in a service area.

13. The system according to claim 12, wherein the mobile station, further comprises:
a receiving module, configured to receive a short message request for locking/unlocking the smart card;
a performing module, configured to perform the locking/unlocking of the smart card; and
a sending module, configured to send a SUCCESSFUL PERFORMANCE short message,
wherein the locking/unlocking of the smart card comprises:

locking/unlocking of the smart card, or locking/unlocking of a payment application of the smart card.

14. A system for remote control of a smart card, comprising:
- a mobile network platform of a mobile network, further comprising:
  - a sending module including a circuitry, configured to send a locking/unlocking short message command to a mobile station when the mobile station is currently connected to the mobile network;
  - a timing module, used for setting a time for sending a locking/unlocking command to the mobile station; and
- a smart card management platform, configured to,
  - receive a user's request for performing a locking/unlocking operation on the smart card, or receive a notification, from a smart card supervising platform, that a user uses the smart card illegally or has corrected an illegal behaviour,
  - perform a short message interaction with the mobile station via the mobile network platform of a mobile network,
  - responsive to said request or notification, query current operation state of the mobile station using the mobile station's identification and location information via the mobile network platform, and
  - control the mobile station via the mobile network platform to perform the locking/unlocking operation on the smart card based on a result of said query and in response change the status of the smart card accordingly,
- wherein the smart card management platform stores dynamic data indicative of statuses of the smart card, the statuses of the smart card comprising a status of locking, a status of unlocking, a status of waiting for locking, and a status of waiting for unlocking, and wherein the controlling comprises:
  - sending a locking short message via the mobile network platform to the mobile station to perform a locking operation in response to the query result; and changing the status of the smart card from unlocking to locking,
  - sending a unlocking short message via the mobile network platform to the mobile station to perform a unlocking operation in response to the query result; and changing the status of the smart card from locking to unlocking,
  - updating the status of the smart card from unlocking to waiting for locking in response to detecting the mobile station is currently in an off line state, and in response to the mobile station being connected to the mobile network and the smart card having a waiting for locking status registered at the smart card management platform, sending the locking short message to the mobile station to perform a locking operation,
  - updating the status of the smart card from locking to waiting for unlocking in response to detecting the mobile station is currently in an off line state, and in response to the mobile station being connected to the mobile network and the smart card having a waiting for unlocking status registered at the smart card management platform, sending the unlocking short message to the mobile station to perform a unlocking operation;
- wherein the off line state indicates the mobile station is turned off or not in a service area.

* * * * *

UNITED STATES PATENT AND TRADEMARK OFFICE
CERTIFICATE OF CORRECTION

PATENT NO. : 8,718,602 B2  Page 1 of 1
APPLICATION NO. : 13/258131
DATED : May 6, 2014
INVENTOR(S) : Wu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 29 days.

Signed and Sealed this
Twenty-ninth Day of September, 2015

Michelle K. Lee
*Director of the United States Patent and Trademark Office*